United States Patent [19]

Ichikawa et al.

[11] Patent Number: 4,643,535

[45] Date of Patent: Feb. 17, 1987

[54] OPTICAL INFORMATION RECORDING/REPRODUCING ELEMENT

[75] Inventors: Hiroyuki Ichikawa, Takarazuka; Hisami Nishi, Nishinomiya; Minoru Toyama, Takarazuka, all of Japan

[73] Assignee: Nippon Sheet Glass Co., Ltd., Japan

[21] Appl. No.: 690,137

[22] Filed: Jan. 10, 1985

[30] Foreign Application Priority Data

Jan. 13, 1984 [JP] Japan .................................. 59-4575

[51] Int. Cl.⁴ ................................................ G02B 3/00
[52] U.S. Cl. .................................................... 350/413
[58] Field of Search .......................................... 350/413

[56] References Cited

U.S. PATENT DOCUMENTS 2,216,965 10/1940 Sukumlyn ............................ 350/413
3,486,808 12/1969 Hamblen .............................. 350/413
3,729,253 4/1973 Moore et al. ......................... 350/413

*Primary Examiner*—John K. Corbin
*Assistant Examiner*—Rebecca D. Gass
*Attorney, Agent, or Firm*—McDougall, Hersh & Scott

[57] ABSTRACT

An element of the invention focuses and projects a parallel or substantially parallel light beam onto an optical information recording medium. The element consists of a transparent columnar body having a convex surface as the input surface and a flat surface as the output surface.

4 Claims, 3 Drawing Figures

OPTICAL INFORMATION RECORDING/REPRODUCING ELEMENT

BACKGROUND OF THE INVENTION

1. Field of the Invention

The present invention relates to an optical element which can be suitably used for recording/reproducing information using an optical information recording medium such as a video disk, a compact disk, an optomagnetic recording apparatus or the like.

2. Description of the Prior Art

An optical element used for the purpose described above focuses parallel light from a light source onto a recording medium. Aberration of the element outside the optical axis, especially coma, must be sufficiently corrected in consideration of an assembly error introduced by assembly of an optical system and application conditions, e.g., a plurality of light beams are passed through a single optical element and a tracking beam among these incident beam is incident at an element position outside the optical axis. In practice, when the wavelength of light used is represented by $\lambda$, the residual wavefront aberration must be within $\lambda/4$. In addition, the element must be compact in size, light in weight, and inexpensive. In the past, various types of optical information recording/reproducing optical elements have been proposed. However, each of such elements is subject to some problems.

For example, when a focusing lens consisting of a number of normal spherical lenses each comprising a transparent material having a uniform refractive index is used, since the lens becomes large in size and heavy, the overall apparatus cannot be rendered compact in size and light in weight. In addition, due to the heavy weight of the lens, tracking and servo control of the optical pickup is adversely affected.

When light beams are passed through a number of lenses, reflection loss occurs at each lens surface, and the optical power of light reaching the recording medium is reduced. For this reason, beam control reliability is impaired.

In addition, since the optical system becomes complex in structure, high-precision processing and assembly cannot be performed.

In order to solve these problems encountered with an assembled spherical lens, a graded index lens having one concave surface has been proposed as in Japanese Patent Disclosure No. 58-122512. However, in general, an optical information recording/reproducing element has a very small diameter below several millimeters, for example. Therefore, it is very difficult to process one surface into a concave surface having a predetermined radius of curvature. Even if a concave surface with a predetermined radius of curvature can be obtained, a sharp edge of the lens is subject to chipping. Furthermore, with a lens having a flat surface at the light source side and a concave surface at the recording medium side, since the concave surface has a negative power, a desired NA cannot be obtained unless a very large power is obtained with a refractive index distribution within the lens. This requires a large difference in refractive index within the lens, and control of terms of high orders of a refractive index constant, rendering the manufacture of the lens extremely difficult.

OBJECT OF THE INVENTION

It is a main object of the present invention to provide a compact and lightweight optical information recording/reproducing element which is free from the problems of a conventional element, which has a high optical performance with small aberration and which is easy to manufacture.

DETAILED DESCRIPTION OF THE PREFERRED EMBODIMENT

The preferred embodiment of the present invention will now be described with reference to the accompanying drawings.

Figure 1:
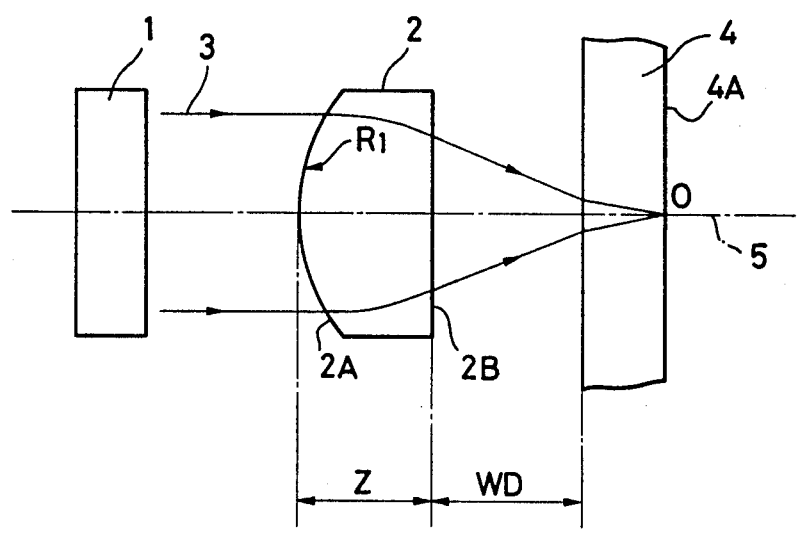
FIG. 1 is a longitudinal sectional view of an embodiment of the present invention.

Referring to FIG. 1, reference numeral 1 denotes a light source; and 2, an optical element according to an embodiment of the present invention. A parallel light beam 3 emitted from the light source 1 is focused onto a point O on a recording surface 4A of an optical information recording medium 4 by the element 2. Optical recording of information or readout of recorded information of the recording medium 4 is performed at the point O. In general, the light beam 3 is a completely parallel light beam or a light beam having a convergence angle (half angle) within $\pm 5°$. The light beam 3 is incident on the element 2 parallel to or at a predetermined inclined angle with respect to a central axis 5. A working distance WD from an output end surface 2B of the element 2 to the recording medium 4 is generally 0.5 to 2.5 mm. The element 2 comprises a columnar body of a transparent material (transparent to light of wavelength used) such as glass or a synthetic resin which has a refractive index distribution which decreases from the central axis 5 toward the outer periphery of the element 2. An input end surface 2A of the element 2 at which the light beam 3 from the light source 1 is incident is a convex surface, and the output end surface 2B is a flat surface perpendicular to the central axis 5.

In the present invention, the orientation of the end surfaces of the element 2 is an important factor; the convex end surface 2A must face the light source 1 and the flat end surface 2B must face the recording medium 4. If the end face of the element 2 facing the light source 1 is a flat surface and the other end face facing the recording medium 4 is a convex surface, an output beam from the element 2 emerges at a relatively large angle with respect to the normal to the refracting surface of the recording medium 4. This results in aberration of high order at the refracting surface, and the spherical aberration at the periphery of the element 2 cannot be fully corrected. In addition, due to an increase in the deficiency amount of the sine condition, the characteristics at points of the element outside the axis are impaired. On the other hand, if the end surface 2A of the element 2 facing the light source 1 is a convex surface and the end face 2B facing the recording medium 4 is a flat surface, the light beam 3 incident on the element 2 is refracted twice at the two surfaces 2A and 2B. Then, the spherical aberration is reduced to the minimum and the sine condition can be satisfied.

The refractive index distribution of the element 2 according to the present invention can generally be given by:

$$n^2(r) = n_0^2[1 - (gr)^2 + h_4(gr)^4 + h_6(gr)^6 + h_8(gr)^8 + \ldots] \quad (1)$$

where $n_0$ is the refractive index on the central axis 5, $n(r)$ is the refractive index at a point of a distance r from the central axis 5, and g, $h_4$, $h_6$ and $h_8$ are distribution constants. When an element 2 having the refractive index distribution given by the equation (1) above is used, the element can exhibit a particularly high performance with low aberration when $n_0$, g and the effective radius $r_0$ are set to fall within a hatched region shown in FIG. 2.

Figure 2:
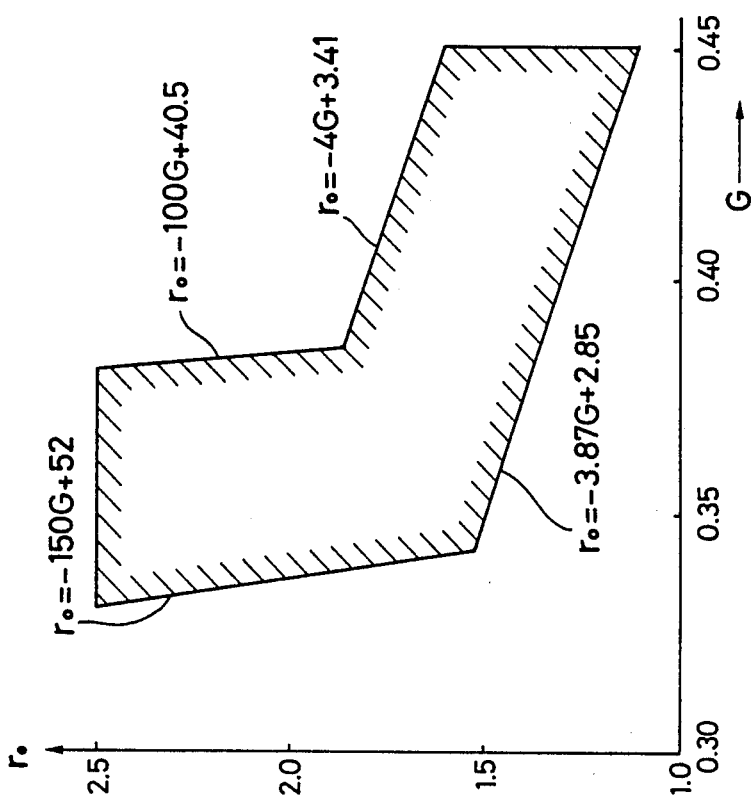
FIG. 2 is a graph showing an effective radius $r_0$ as a function of a product G of the effective radius $r_0$, a refractive index distribution constant g and a refractive index $n_0$ on the axis of the element according to the present invention so as to illustrate optimal ranges of $r_0$, g and $n_0$.

In the graph shown in FIG. 2, the product G of the refractive index $n_0$, the distribution constant g, and the effective radius $r_0$ is plotted along the axis of abscissa, and the effective radius $r_0$ is plotted along the axis of ordinate. The hatched region in the graph shown in FIG. 2 is bounded by lines given by $r_0 = 2.5$ (mm), $G = 0.45$, $r_0 = -150G + 52$ (mm), $r_0 = -3.87G + 2.85$ (mm), $r_0 = -100G + 40.5$ (mm), and $r_0 = -4G + 3.41$ (mm).

In a region satisfying the conditions $r_0 > -100G + 40.5$ and $r_0 > -4G + 3.41$ and outside the hatched region, the correction of the deficiency amount of the sine condition is insufficient. In a region satisfying the condition $r_0 < -150G + 52$ and outside the hatched region, this correction amount becomes excessive. In a region satisfying the condition $r_0 < -3.87G + 2.85$ and outside the hatched region, correction of the spherical aberration is difficult. When the values of $r_0$, g and $n_0$ are in the hatched region, the absolute value of the deficiency amount of the sine condition can be reduced to a very small value of 0.2% or less.

Examples of specifications of the element according to the present invention are given below:

Z = 1.41 mm
$R_1$ = 2.5 mm
$n_0$ = 1.6000
g = 0.162 mm$^{-1}$
$h_4$ = −0.68
$h_6$ = −2.5, $h_8$ = −10
f = 3.42 mm
WD = 1.8 mm where Z is the element length, $R_1$ is the radius of curvature of the refracting surface facing the light source, $n_0$ is the refractive index on the central axis, g, $h_4$, $h_6$ and $h_8$ are distribution constants, f is the focal length at the side of the image, and WD is the working distance from the element output end face to the recording medium. The aberration curve of the element having these specifications is shown in FIG. 3.

Figure 3:
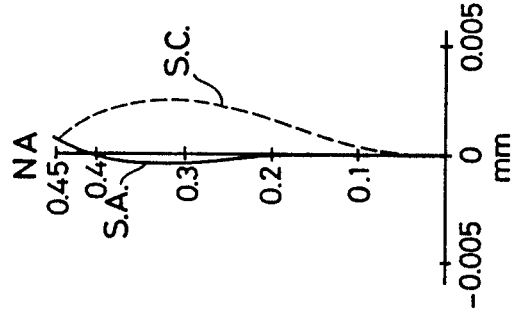
FIG. 3 is a graph showing the spherical aberration (solid line) and the sine condition deficiency amount (broken line) in an example of the present invention.

Referring to FIG. 3, the solid curve represents the spherical aberration and the dotted curve represents the deficiency amount of the sine condition.

What is claimed is:

1. An optical information recording/reproducing element for focusing and projecting a parallel or substantially parallel light beam onto an optical information recording medium, wherein the element comprises a transparent columnar body having a convex surface as an incident surface of the light beam, and a flat surface as an output surface thereof, said columnar body having a refractive index distribution according to which a refractive index gradually decreases from a central axis toward a periphery of the columnar body,
said refractive index distribution being given by:

$$N^2(r) = n_0^2[1 - (gr)^2 + h_4(gr)^4 + h_6(gr)^6 + \ldots]$$

where $n_0$ is a refractive index on the central axis, $n(r)$ is a refractive index at a point of a distance r from the central axis, and g, $h_4$ and $h_6$ are distribution constants, and
said element satisfies the following conditions:

$-150G + 52 \text{ mm} \leq r_0 \leq -100G + 40.5 \text{ mm}$ $r_0 \leq 2.5 \text{ mm}$ $G \leq 0.45$ where $r_0$ is an effective element radius and G is a product of $n_0$, g and $r_0$.

2. An element according to claim 1, wherein an absolute value of a deficiency amount of a sine condition for an incident light beam at least at a portion of the incident surface of the element is not more than 0.2%.

3. An optical information recording/reproducing element for focusing and projecting a parallel or substantially parallel light beam onto an optical information recording medium, wherein the element comprises a transparent columnar body having a convex surface as an incident surface of the light beam, and a flat surface as an output surface thereof, said columnar body having a refractive index distribution according to which a refractive index gradually decreases from a central axis toward a periphery of the columnar body,
said refractive index distribution being given by:

$$N^2(r) = n_0^2[1 - (gr)^2 + h_4(gr)^4 + h_6(gr)^6 + \ldots]$$

where $n_0$ is a refractive index on the central axis, $n(r)$ is a refractive index at a point of a distance r from the central axis, and g, $h_4$ and $h_6$ are distribution constants, and
said element satisfies the following conditions:

$-3.87G + 2.85 \text{ mm} \leq r_0 \leq -4G + 3.41 \text{ mm}$ $r_0 \leq 2.5 \text{ mm}$ $G \leq 0.45$ where $r_0$ is an effective element radius and G is a product of $n_0$, g and $r_0$.

4. An element according to claim 3, wherein an absolute value of a deficiency amount of a sine condition for an incident light beam at least at a portion of the incident surface of the element is not more than 0.2%.

* * * * *